United States Patent [19]

Lerner et al.

[11] Patent Number: 4,705,484

[45] Date of Patent: Nov. 10, 1987

[54] POWER CORD, WIRE AND CABLE CONTAINER

[75] Inventors: Lawrence Lerner, Beverly Hills; Stephen P. Diskin, Los Angeles, both of Calif.

[73] Assignee: MEGA/ERG Inc., Beverly Hills, Calif.

[21] Appl. No.: 916,864

[22] Filed: Oct. 9, 1986

[51] Int. Cl.$^4$ .......................................... H01R 13/60
[52] U.S. Cl. ................................... 439/502; 191/12.4
[58] Field of Search ............. 339/2 RL, 5 RL, 6 RL, 339/8 RL, 119 C; 191/12.2, 12.4; 242/85.1

[56] References Cited

U.S. PATENT DOCUMENTS 3,409,246 11/1968 De Pas ............................ 339/5 RL

FOREIGN PATENT DOCUMENTS 2620432 11/1977 Fed. Rep. of Germany ... 339/119 C
2638617 3/1978 Fed. Rep. of Germany ... 339/119 C Primary Examiner—Eugene F. Desmond
Attorney, Agent, or Firm—Charles H. Schwartz; Ellsworth R. Roston

[57] ABSTRACT

A power cord wire and cable container in the form of a cannister including a protective cover, an internal cylinder around which power cords, cables, or any wiring can be neatly and compactly wound, separated by adjustable notched rings capable of holding cords in place and a multiplicity of power receptacles fed from a single outside source. The device can be used with virtually any appliances and serves to shorten and efficiently organize the connection and power requirements of a variety of appliances, to minimize exposed lengths of connecting wires or power cords, especially when numerous appliances are used in combination and simultaneously, as in data processing workstations or with household music reproduction systems.

6 Claims, 3 Drawing Figures

U.S. Patent  Nov. 10, 1987  4,705,484
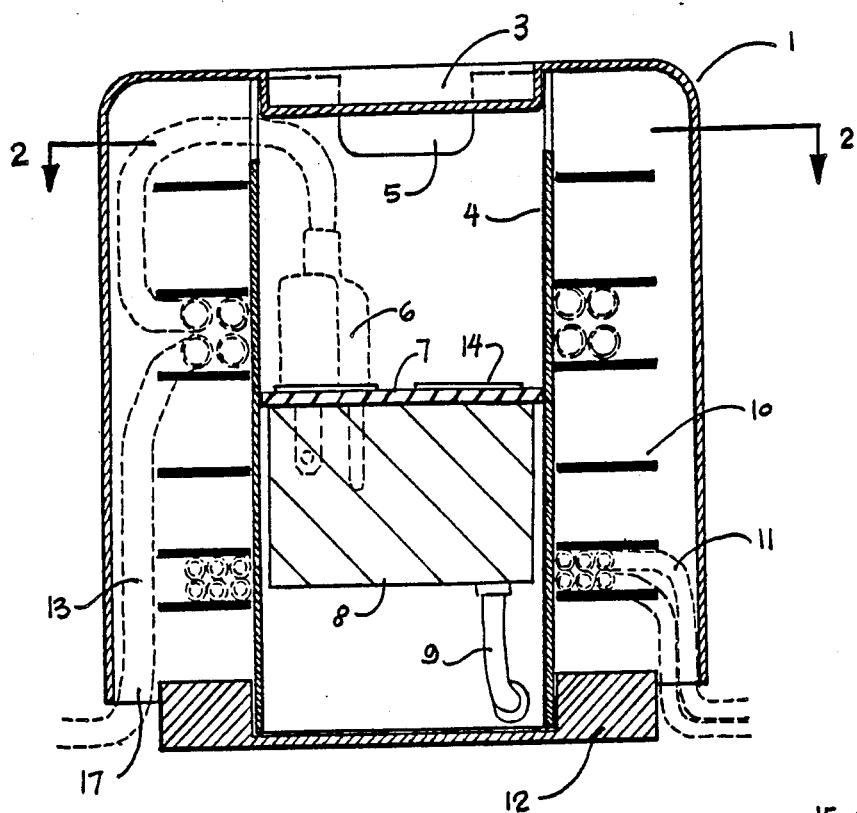
Fig. 1
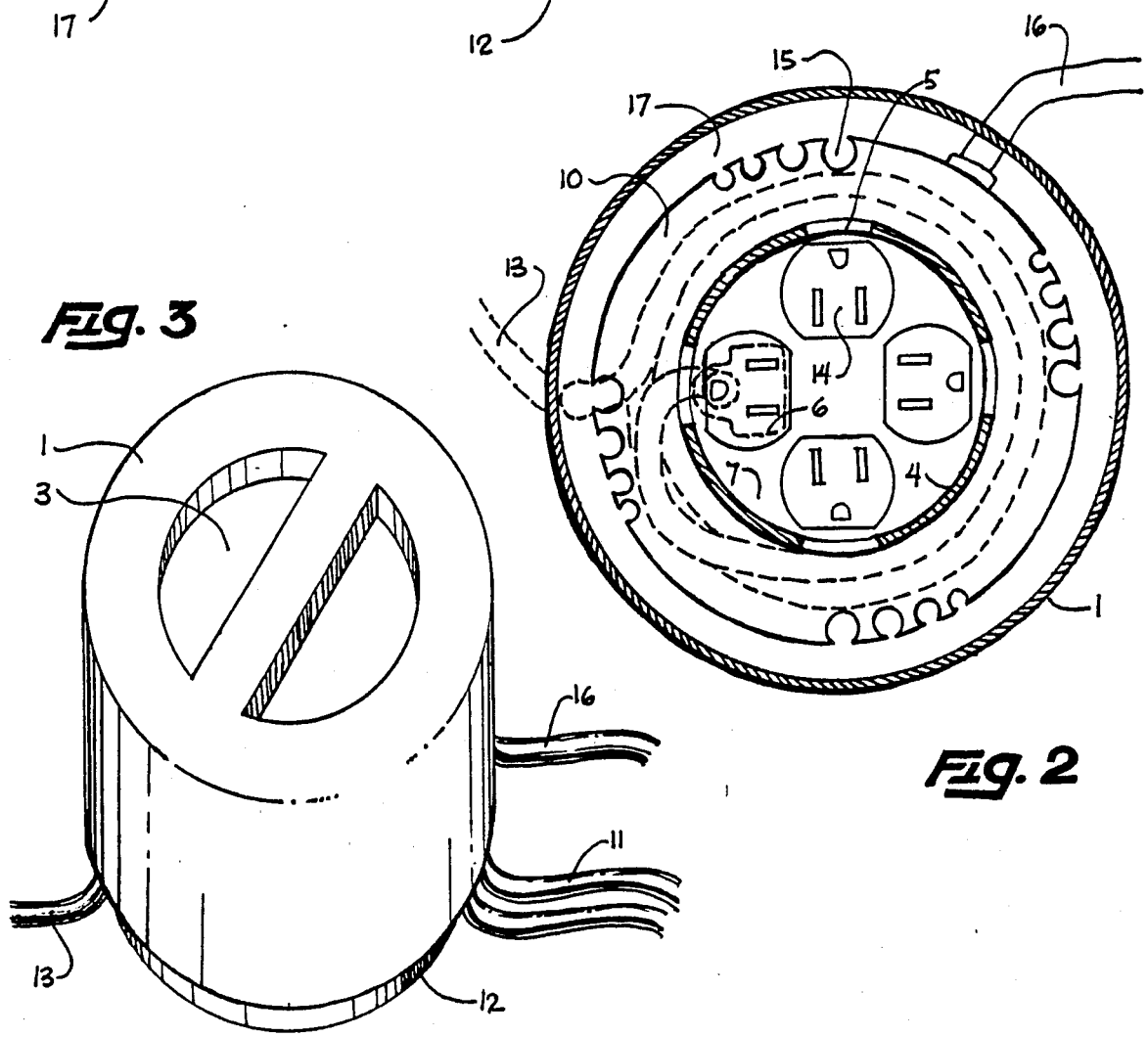
Fig. 3
Fig. 2

POWER CORD, WIRE AND CABLE CONTAINER

BACKGROUND

The present invention addresses the need to safely, efficiently and neatly organize wiring and power cords. The proliferation of data processing systems and various electric and electronic desk top or household counter-top appliances brings with it an equal proliferation of power cords, connectors and wiring of different types. Lengths of most cables are fixed, leaving trails of unsightly, confusing and potentially hazardous wires everywhere.

Casual observation suggests that power supply cords are the most numerous; however, many other non-powered cables and wires are common. Some devices provide reels or small compartments which partially answer the need to shorten wires to no more than the required length for use of the device. Nevertheless, no comprehensive invention for controlling length, position and power requirements has yet been devised. Thus, from the point of view of safety (cords are effectively shortened so they do not drape or intrude into areas where they may interfere with other objects or with the motion of human users), efficiency (wires and cords are more neatly and clearly organized and are more easily routed, substituted or replaced), and economy of space (total number of wires crossing a desk top or other work surface is reduced, freeing that surface for other usage), the present invention is offered as an improved solution.

SUMMARY

The present power cord and wire container is meant to provide a storage cannister and power supply for numerous wires and cords which frequently are found on a typical desktop or workstation surface with common electrical or electronic appliances. To achieve this, the device consists of a central hollow cylinder fitted in the interior with a multiplicity of power receptacles into which may be plugged the power cords of any number of small appliances. The extra length of said power cords may be coiled neatly around the periphery of said cylinder along with other non-powered connector type cables which enter and exit the device solely for shortening to minimum manageable length. The coils are partially restrained and separated by a plurality of notched flat discs. Finally, a cover is fitted to close the device.

The primary object of the invention is to be a compact power cord and wire manager which organizes and safely and efficiently holds and shortens to length any of a number of powered and non-powered wires, connectors, cords and cables.

Other objects and advantages will appear from the following description and which refer to the drawings.

BRIEF DESCRIPTION OF THE DRAWINGS

FIG. 1 is a cross sectional view taken along its longitudinal axis, of a power cord and wire manager constructed in accordance with the present invention.

FIG. 2 is a transverse cross section of the device taken along the line 2—2 in FIG. 1.

FIG. 3 is an isometric top view of the device.

DETAILED DESCRIPTION

Referring to the invention in more detail in FIG. 1, the entire device is closed by a cover (1) with recessed grip (3), which protects the power receptacles and wire coils on the interior, but allows cables such as those shown in dotted lines (11,13) to enter or exit the device through a continuous gap (17) around the periphery, said gap being the space between the cover and support means (12). The support means in the preferred embodiment of the device is a cylindrical base of sufficient weight to prevent easy overturning of the device and is provided with an indentation to accept the central coiling cylinder (4). Other embodiments of the invention would configure said support means (12) as a wall mount disc which would permit the device to cantilever from a wall or other partition surface, or a mounting plate for securing the device in an inverted position beneath a desk or horizontal surface. Both alternate mounting positions offer the added advantage of freeing useable work surface for other usage and for locating cabling and the present invention in an area of minimum intrusion.

The central coiling cylinder (4) constitutes the main structure of the device and allows wires of a range of gauges to be wound tightly and neatly around its circumference. The bottom of the coiling cylinder is fitted to a support means (12) while the top of the cylinder is appropriately notched (5) to allow power cords to exit to the exterior as shown. At the interior of the coiling cylinder is a circular plate (7) to which are mounted a plurality of standard power receptacles (14) the wiring of which may be grouped in a common enclosure (8). A single power feed (9) connects said power receptacles via a power cord (16) exiting the device to a source of AC power.

A final component of the device is a notched ring, a series of which are included in the device, which are adjustable in position along the longitudinal axis of the coiling cylinder. The purpose of the rings is to organize individual coils of wires and partially to restrain these wires from uncoiling or movement via a multiplicity of notches, at many points on the periphery of the rings of various sizes to accommodate different wire gauges. Rings may be adjusted up or down and are held in place only by moderate friction against the wall of the coiling cylinder.

Two examples of the use of the device are shown in the drawings. FIG. 1 shows the power plug (6) of a moderately heavy gauge cable (13) inserted into a power receptacle (14). The cable exits to the coiling portion of the cylinder through an opening (5) and is then coiled to any number of desired windings. At the desired point, said cable is clipped into the proper-sized notch and the remainder of the cable is drawn downward and positioned such that when the cover (1) is placed over the device, the cable (13) will exit through the gap (17) provided.

Similarly a smaller gauge non-power connecting wire is shown in dotted lines (11). In this case another coil is formed about the circumference of the coiling cylinder, but rather than terminating at the power receptacle portion of the device, this wire is simply introduced into the device, coiled, slipped into an appropriate notch in an adjacent ring similar to the one shown at (10), and then made to exit the device.

FIG. 2 shows a section through the invention, showing in dotted lines a view of a heavy gauge power cable (13) with its plug (6) inserted into a receptable (14), exiting through an opening (5) in the coiling cylinder (4), being coiled and resting on a notched ring (10) and then exiting the device through the annular gap (17) between cover (1) and support means.

Finally, FIG. 3 illustrates the device with its cover (1) in place and clearly shows a recessed portion (3) which forms a handle for removal and replacement, as well as the device's power cord (16) and support means (12). It should be noted that the annular gap near the bottom of the device (17) allows wires (11, 13) to enter and exit the device at any point around the periphery, thus facilitating positioning and efficient use.

We claim:

1. A power cord, cable and wire container including,
   a base member,
   a first cylindrical member having a first particular diameter coupled to and extending outwardly from the base member,
   a second cylindrical member having a second particular diameter greater than the first cylindrical member and having a closed end and an open end,
   the second cylindrical member forming a removable protective cover by coaxially overlaying the first cylindrical member with the open end adjacent to and spaced from the base and the closed end resting on the first cylindrical member to form a storage space between the first and second cylindrical members, and
   a plurality of ring members located within the storage space and with each ring member having an inner diameter greater than the first particular diameter and an outer diameter less than the second particular diameter so that the ring members form a plurality of spacers to segragate individual power cords, cables and wires stored within the storage space by wrapping around the first cylindrical member.

2. The power cord, cable and wire container of claim 1 additionally including a plurality of power receptacles located within the first cylindrical member for receiving individual power plugs located at the ends of individual power cords wrapped around the first cylindrical member and additionally including means for supplying electrical power to the plurality of power receptacles.

3. The power cord, cable and wire container of claim 2 wherein the first cylindrical member includes at least one end slot adjacent the closed end of the second cylindrical member to allow passage of an individual power cord from the storage space to the power receptacles.

4. The power cord, cable and wire container of claim 1 wherein the ring members include circumferential notches to receive and guide individual power cords, cables or wires stored within the storage space and with end portions of the individual power cords, cables or wires passing out of the container through the space between the open end of the space cylindrical member and the base.

5. The power cord, cable and wire container of claim 1 wherein the closed end of the second cylindrical member includes a recessed portion to rest within the end of the first cylindrical member.

6. The power cord, cable and wire container of claim 5 wherein the recessed portion additionally includes a handle member.

* * * * *